United States Patent
Meredith (10) Patent No.: US 8,285,903 B2
(45) Date of Patent: Oct. 9, 2012

(54) REQUESTS AND DATA HANDLING IN A BUS ARCHITECTURE

(75) Inventor: Jason Meredith, Hemel Hempsted (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 278 days.

(21) Appl. No.: 12/803,392

(22) Filed: Jun. 25, 2010

(65) Prior Publication Data

US 2011/0231588 A1 Sep. 22, 2011

(30) Foreign Application Priority Data

Mar. 19, 2010 (GB) .................................. 1004678.7

(51) Int. Cl.
*G06F 13/00* (2006.01)

(52) U.S. Cl. ........................... 710/110; 710/121; 326/38

(58) Field of Classification Search .................. 710/110, 710/119–123, 240–244; 326/38
See application file for complete search history.

(56) References Cited

U.S. PATENT DOCUMENTS

| | | | |
|---|---|---|---|
| 5,809,278 | A | 9/1998 | Watanabe et al. |
| 5,996,036 | A | 11/1999 | Kelly |
| 6,073,210 | A | 6/2000 | Palanca et al. |
| 6,138,176 | A | 10/2000 | McDonald et al. |
| 6,275,914 | B1 | 8/2001 | Jeddeloh |
| 6,697,904 | B1 | 2/2004 | Bennett |
| 6,853,382 | B1 | 2/2005 | Van Dyke et al. |

(Continued)

FOREIGN PATENT DOCUMENTS

EP 0 924 621 A2 6/1999

(Continued)

OTHER PUBLICATIONS

Great Britain Intellectual Property Office Combined Search and Examination Report dated Feb. 3, 2011 (3 pages).

(Continued)

*Primary Examiner* — Clifford Knoll
(74) *Attorney, Agent, or Firm* — Flynn, Thiel, Boutell & Tanis, P.C.

(57) ABSTRACT

The present invention relates to improved methods for processing requests and sending data in a bus architecture. The present invention further relates to an improved bus architecture for processing requests and data. There is provided a method for processing read requests in a bus architecture comprising at least one master device connected to at least two slave devices via a bus. The architecture comprises an allocator for allocating incoming requests from the master device to a target slave device and an optimiser for each slave device. Each optimiser is for buffering incoming requests for the respective slave device. The method comprising the steps of: a) the master device sending a read request for a first slave device to the bus; b) the allocator generating a current-state indicator associated with the read request. The current-state indicator has an initial value, The method further comprises c) the allocator generating a priority indicator associated with the read request; d) the allocator sending the read request, the current-state indicator and the priority indicator to the optimiser of the first slave device; e) the optimiser of the first slave device receiving the read request, the current-state indicator and the priority indicator. Finally, if the initial value of the current-state indicator equals the value of the priority indicator, the method comprises processing the read request; or if the initial value of the current-state indicator does not equal the value of priority indicator, the method comprises deferring processing of the read request until a later time.

20 Claims, 6 Drawing Sheets

U.S. PATENT DOCUMENTS

| | | |
|---|---|---|
| 8,156,273 B2 * | 4/2012 | Moran et al. .................. 710/110 |
| 2006/0031615 A1 | 2/2006 | Bruce et al. |
| 2006/0101178 A1 | 5/2006 | Zhong et al. |
| 2007/0214298 A1 | 9/2007 | Sullivan, Jr. et al. |
| 2007/0283064 A1 | 12/2007 | Lai |
| 2008/0162760 A1 | 7/2008 | Jacob |
| 2008/0282007 A1 | 11/2008 | Moran et al. |

FOREIGN PATENT DOCUMENTS

| | | |
|---|---|---|
| EP | 1 191 452 A2 | 3/2002 |
| GB | 2 415 067 A | 12/2005 |

OTHER PUBLICATIONS

International Search Report dated Oct. 11, 2011 for corresponding PCT Application No. PCT/GB2011/000291.

Search and Examination Report of the United Kingdom Patent Office dated Jul. 27, 2010 (6 pages).

* cited by examiner

REQUESTS AND DATA HANDLING IN A BUS ARCHITECTURE

FIELD OF THE INVENTION

The present invention relates to improved methods for processing requests and sending data in a bus architecture. The present invention further relates to an improved bus architecture for processing requests and data.

BACKGROUND OF THE INVENTION

As is well known, many computing systems employ architectures in which one or more master devices are connected to one or more slave devices via a bus. The master and slave devices may comprise general purpose processors, memory controllers, interface chipsets, input output devices and other integrated circuits that process data requests. More and more such bus architectures are being integrated within SoC (System on Chip) devices.

Figure 1:
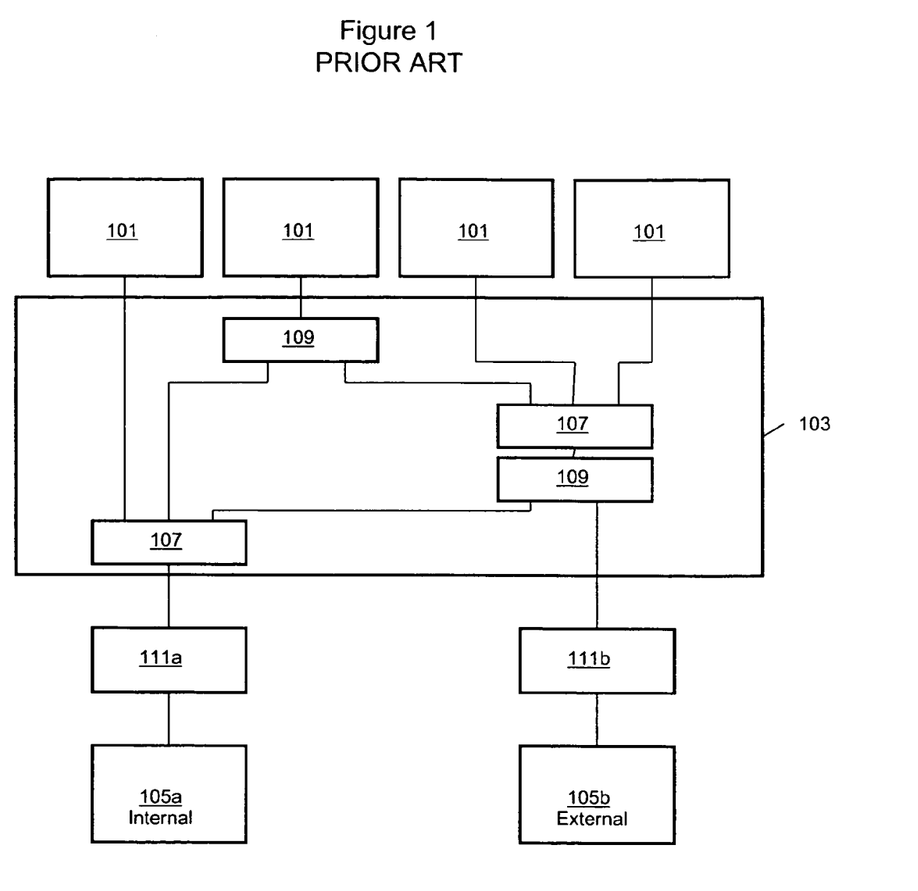

An example of such a bus architecture is shown in FIG. 1. A plurality of master devices 101 are connected via bus 103 to a plurality of slave devices 105a, 105b. In FIG. 1, slave device 105a is an internal slave apparatus and slave device 105b is an external slave apparatus. The architecture in FIG. 1 also includes arbiters 107, allocators 109 and optimisers 111a, 111b. The arbiters allow two or more master devices to be connected to one slave device. Arbitration of the priority for the bus use rights is executed by the arbiter. The allocators allow one master device to be connected to two or more slave devices. The routing of the bus traffic to the relevant slave device is performed via address decoding. If a target slave device is unavailable (for example, powered off or disabled from operation), the allocator can be informed and traffic for that slave device may be handled within the allocator. The optimisers allow the traffic for a slave device to be buffered and re-sorted to increase the efficiency of access to the slave device. They act as an intelligent buffer for the particular slave device. In FIG. 1, optimiser 111a is an internal optimiser for internal slave device 105a and optimiser 111b is an external optimiser for external slave device 105b. The optimisers in FIG. 1 are shown external to the bus. However, since the optimisers are the link between the bus and the slave device, they can be considered either as part of the bus or as part of the slave device. Typically, the input side of the optimiser upholds the bus requirements and bus protocols whereas the output side of the optimiser upholds the slave requirements. The particular architecture of a bus structure may take any number of forms and FIG. 1 is a relatively simple example. The pathways between the master devices and the slave devices can be implemented most advantageously for the master devices' access patterns and requirements.

In FIG. 1, the optimisers 111a, 111b, which function as buffers for incoming requests, are provided close to the respective slave apparatus 105a, 105b. This provides several advantages. Incoming requests may be gathered in the optimiser when the target slave apparatus has a period of unresponsiveness. This allows the requests to be ordered to improve the efficiency of the slave device access when accesses are allowed. Additional signalling is also provided from the optimisers to the master devices to warn when the buffering for a particular master device is becoming full. This enables the optimiser to cease request traffic for a particular master device, which prevents a request waiting outside the optimiser when the optimiser buffer is full. A request waiting outside the optimiser may block all other accesses to the target slave device (although buffering may be provided individually per master device), and could lead to the connecting bus structure preventing any request movement until resolution of the situation. When the buffer is becoming full and an optimiser requests a master device to cease sending traffic, there may be request traffic relating to this master device already within the bus architecture. In addition, a master device may continue to send a pre-defined number of requests after a request to cease traffic. This means that a cease indication from an optimiser must be activated at a point before the buffer fills, to ensure that there is always enough buffer space to accept the in-progress traffic.

In a bus architecture such as that shown in FIG. 1, the master devices are not required to have any specific knowledge of the slave devices which they are targeting for access. This results in the request ordering requirements expected by the master device being handled within the bus architecture. There is an expectation that requests issued by a master device will be operated in the sequence of issue. For write requests, in the current implementation, there is no feedback to the master device requesting the write, so the ordering requirement is upheld for each particular slave device target. For read requests, however, the returning data must arrive in the expected order, and so control is required to ensure this happens correctly. With an increasing number of bus architectures being integrated within SoC devices, more sophisticated bus structures are required to allow each bus to operate its traffic at the required performance levels.

SUMMARY OF THE INVENTION

According to a first aspect of the invention, there is provided a method for processing read requests in a bus architecture comprising at least one master device connected to at least two slave devices via a bus, the architecture comprising an optimiser for each slave device, each optimiser for buffering incoming requests for the respective slave device, the method comprising the steps of: a) the master device sending a read request for a first slave device to the bus; b) generating a priority indicator associated with the read request; c) generating a current-state indicator associated with the read request, the current-state indicator having an initial value; d) sending the read request, the priority indicator and the current-state indicator to the optimiser of the first slave device; e) the optimiser of the first slave device receiving the read request, the priority indicator and the current-state indicator; and i) if the initial value of the current-state indicator equals the value of the priority indicator, processing the read request; or ii) if the initial value of the current-state indicator does not equal the value of priority indicator, deferring processing of the read request until a later time.

By generating a priority indicator and a current-state indicator with a particular initial value, the read request will only be actioned when it is appropriate to do so. Thus, returning data from read requests may be returned in the same order in which the read requests were issued. This may be important if the read request is dependent on one or more earlier requests having been completed. This also may be important if some read paths have different latency from others. Moreover, this is usually a general requirement of master devices transmitting requests over a bus. The current-state indicator generated shows the current state of the bus traffic at any time in as far as this is relevant to the pending read request in question. The initial value of the current-state indicator may be selected according to whether the read request is dependent on other requests within the bus architecture having been completed, and whether any of those requests have already been completed. Of course, if the read request is not dependent on any other requests having been completed, the initial value of the current-state indicator may simply be set to be equal to the value of the priority indicator. The value of the priority indicator may be selected according to whether the read request is dependent on other requests within the bus architecture having been completed.

Preferably, the architecture comprises an allocator for allocating incoming requests from the master device to a target slave device. In that case, the allocator may perform step b) of generating a priority indicator associated with the read request. The allocator may perform step c) of generating a current-state indicator associated with the read request. The allocator may perform step d) of sending the read request, the priority indicator and the current-state indicator to the optimiser of the first slave device. The allocator may select an appropriate initial value for the current-state indicator as set out above. Alternatively, the master device may perform step b) of generating a priority indicator associated with the read request. The master device may perform step c) of generating a current-state indicator associated with the read request.

The optimiser for each slave device acts as an intelligent buffer for the slave device. It meets bus requirements one side and meets slave device requirements at the other side. The optimiser may be implemented as part of the bus or as part of the slave device. Preferably, the optimiser of the first slave device maintains a queue for incoming requests. Preferably, step i) or ii) is performed only when the read request reaches the front of the optimiser queue. In that case, the step of deferring processing of the read request until a later time may comprise moving the read request to a lower place in the queue.

The priority indicator may take any suitable format. In a preferred embodiment, the priority indicator comprises one or more bits of data added to the read request and transmitted together with the read request. In an alternative embodiment, the priority indicator comprises one or more bits of data, or a data signal, transmitted separately from the read request, either preceding the read request or following the read request. Similarly, the current-state indicator may take any suitable format. In a preferred embodiment, the current-state indicator comprises one or more bits of data, or a data signal, transmitted separately from the read request, either preceding the read request or following the read request. In an alternative embodiment, the current-state indicator comprises one or more bits of data added to the read request and transmitted together with the read request.

In a preferred embodiment, the method further comprises the steps of: sending an updated value of the current-state indicator to the optimiser of the first slave device; and if the updated value of the current-state indicator equals the value of the priority indicator, processing the read request.

In addition, if the updated value of the current-state indicator does not equal the value of priority indicator, the processing of the read request may be deferred, for example paused until a later time. The step of deferring processing of the read request until a later time may comprise moving the read request to a lower place in a queue maintained by the optimiser.

If the architecture comprises an allocator, the allocator may perform the step of sending an updated value of the current-state indicator to the optimiser of the first slave device.

The method may comprise sending the initial value of the current-state indicator to the optimiser of the first slave device more than once. This may be performed by the allocator. For example, the allocator may send the initial value of the current-state indicator to the optimiser of the first slave device repeatedly. Similarly, the method may comprise sending one updated value of the current-state indicator to the optimiser of the first slave device more than once. This may be performed by the allocator. For example, the allocator may send that updated value of the current-state indicator to the optimiser of the first slave device repeatedly. The method may comprise repeatedly sending (different) updated values of the current-state indicator to the optimiser of the first slave device until the value of the current-state indicator is equal to the value of the priority indicator so that the read request may be processed. This may be performed by the allocator. Each of those different updated values may be sent more than once.

In a particularly preferred embodiment, the read request is dependent on one or more earlier read requests having been completed, and the method further comprises: monitoring return of data for the one or more earlier read requests; and sending the updated value of the current-state indicator to the optimiser of the first slave device in response to receipt of data for one or more of the earlier read requests.

If the architecture comprises an allocator, the allocator may perform the step of monitoring return of data for the one or more earlier read requests. The allocator may perform the step of sending the updated value of the current-state indicator to the optimiser of the first slave device in response to receipt of data for one or more of the earlier read requests.

The method may comprise repeatedly sending updated values of the current-state indicator to the optimiser of the first device, each sending being in response to receipt of data for one or more of the earlier read requests, until the value of the current-state indicator is equal to the value of the priority indicator so that the read request may be processed. This may be performed by the allocator.

The bus architecture may comprise more than one allocator. In that case, the initial value of the current-state indicator may be selected by a particular allocator according to the value of a priority indicator or current-state indicator selected by another allocator. Similarly, updated values of the current-state indicator may be selected by a particular allocator according to the value of a priority indicator or current-state indicator selected by another allocator. Similarly, the value of the priority indicator may be selected by a particular allocator according to the value of a priority indicator or current-state indicator selected by another allocator. The precise relationship between indicator values will depend on the specifics of the bus architecture and on which earlier request or requests a particular read request is dependent.

In one embodiment, the value of the priority indicator is equal to the number of earlier read requests on which the read request is dependent and the initial value of the current-state indicator is zero, and the method further comprises: incrementing the value of the current-state indicator by one to form an updated value, when data is received for one earlier read request. This may be performed by the allocator.

In that arrangement, when one earlier read request has been completed, the value of the current-state indicator is incremented. Thus, when all the earlier read requests have been actioned, the value of the current-state indicator will have been incremented sufficiently such that the current-state indicator and the priority indictor values are equal. As the value of the current-state indicator is incremented, the updated value may be sent to the optimiser each time there is an updated value. Alternatively, a component, for example the allocator may simply keep track of the increments internally, and send only some of the updated values to the optimiser, for example only the updated value which is equal to the value of the priority indicator.

Alternatively, the value of the priority indicator may be equal to zero and the initial value of the current-state indicator may be equal to the number of earlier read requests on which the read request is dependent, and the method may further comprise: decrementing the value of the current-state indicator by one to form an updated value, when data is received for one earlier read request. This may be performed by the allocator.

In that arrangement, when one earlier read request has been completed, the value of the current-state indicator is decremented. Thus, when all the earlier read requests have been actioned, the value of the current-state indicator will have been reduced to zero and will be equal to the priority indicator value, so that the read request can be processed. As the value of the current-state indicator is decremented, each and every updated value may be sent to the optimiser. Alternatively, a component, for example the allocator may simply keep track of the decrements internally, and send only some of the updated values to the optimiser, for example only the updated value which is equal to the value of the priority indicator.

According to the first aspect of the invention, there is also provided a bus architecture comprising: a bus for connecting at least one master device with at least two slave devices; and an optimiser for each slave device, each optimiser for buffering incoming requests for the respective slave device; wherein the bus is arranged to receive read requests from the master device for the slave devices; wherein the architecture is arranged to generate a priority indicator associated with each read request and to generate a current-state indicator associated with each read request; and wherein each optimiser is arranged to process a read request when the current value of the current-state indicator equals the value of the priority indicator and to defer processing of the read request until a later time when the current value of the current-state indicator does not equal the value of the priority indicator.

In a preferred arrangement, the architecture includes an allocator for allocating incoming requests from the master device to a target slave device. In that case, preferably, the allocator is arranged to generate the priority indicator or the current-state indicator or both.

Preferably, the architecture is further arranged to set an initial value for the current-state indicator and to subsequently set one or more updated values for the current-state indicator. This may be performed by the allocator.

In one embodiment, a read request sent by the master device is dependent on one or more earlier read requests having been completed and the architecture is further arranged to monitor return of data for the one or more earlier read requests and to set an updated value of the current-state indicator in response to receipt of data for one or more of the earlier read requests. This may be performed by the allocator.

Features described in relation to the method of this aspect of the invention may also be applicable to the architecture of this aspect of the invention and features described in relation to the architecture of this aspect of the invention may also be applicable to the method of this aspect of the invention.

According to a second aspect of the invention, there is provided a method for processing requests in a bus architecture comprising at least two master devices connected to at least one slave device via a bus, the architecture comprising an optimiser for the or each slave device, each optimiser for buffering incoming requests for the respective slave device, the method comprising the steps of: a) a first of the at least two master devices sending a write request for a slave device to the bus; b) generating a fence indicator associated with the write request, the fence indicator indicating that the write request to the slave device should be completed before subsequently issued requests from at least the first of the master devices to any slave device are commenced; c) sending the fence indicator to the or each optimiser; d) each optimiser processing all its requests issued before the write request with which the fence indicator is associated, and the optimiser of the slave device to which the write request was directed further processing the write request itself, and each optimiser deferring the processing of any requests from at least the first master device issued after the write request with which the fence indicator is associated; and e) each optimiser outputting, once all its requests issued before the write request with which the fence indicator is associated have been processed, and if the optimiser is the optimiser of the slave device to which the write request was directed, once all its requests issued before the write request with which the fence indicator is associated, and the write request itself, have been processed, a completion indicator.

Because a write request usually does not require any return data to indicate when the write has been completed, it is impossible for the bus components to know when the data has been written. By generating a fence indicator, which indicates that the write request to the slave device should be completed before subsequently issued requests from the master devices are commenced, it can be ensured that the correct data is read on subsequently issued requests. That is to say, requests can be performed in the correct order. Once all requests issued before the write request in question and the write request itself, have been processed, this is indicated by the completion indicators.

Preferably, the architecture comprises an allocator for allocating incoming requests from the master devices to a target slave device. In that case, the allocator may perform step b) of generating the fence indicator. The allocator may perform step c) of sending the write request and the fence indicator to the or each optimiser. That may be by simply issuing the write request and fence indicator on all the allocator's output ports. Alternatively, the master device which sent the write request may perform step b) of generating the fence indicator.

The optimiser for the or each slave device acts as an intelligent buffer for the slave device. It meets bus requirements one side and meets slave device requirements at the other side. Each optimiser may be implemented as part of the bus or as part of the slave device. Preferably, the optimiser maintains a queue for incoming requests for its slave device.

In one embodiment, the fence indicator indicates that the write request to the slave device should be completed before subsequently issued requests from only the first master device, to any slave device, are commenced. This operation may be effective when the architecture comprises a slave device which allows access from one master device to another master device. In that arrangement, the second master device may commence a read request only on receipt of a request from the first master device via the access slave device. The first master device might issue that request after a write request, with which the fence indicator is associated.

Alternatively, the fence indicator may indicate that the write request to the slave device should be completed before subsequently issued request from some or all the master devices, to any slave device, are commenced. This operation may be effective when the master devices are issuing various read and write requests, without prompting or communication from other master devices.

The fence indicator may take any suitable format. In one embodiment, the fence indicator comprises one or more bits of data added to the write request and transmitted together with the write request. In that case, the fence indicator may replace the address information in the write request. In an alternative embodiment, the fence indicator comprises one or more bits of data, or a data signal, transmitted separately from the write request, either preceding the write request or following the write request.

The completion indicators may also take any suitable format. In one embodiment, the completion indicators comprise one or more bits of data, or a data signal, transmitted from the optimisers. Effectively, the completion indicators act as returning data, just as if the write request was a read request. Contrast this with a normal write request which requires no return data.

Preferably, the method further comprises, once completion indicators from all optimisers have been outputted, instructing each optimiser to continue processing any requests issued after the write request with which the fence indicator is associated, which have had processing deferred at step d).

As already mentioned, preferably, the architecture comprises an allocator for allocating incoming requests from the master devices to a target slave device. In that case, the allocator may monitor outputting of the completion indicators preferably by the allocator receiving the completion indicators when they are outputted. In addition, the allocator may instruct each optimiser to continue processing any deferred requests once the allocator has received completion indicators from all the optimisers.

In a particularly preferred embodiment, the architecture comprises an allocator for allocating incoming requests from the master devices to a target slave device, and the method further comprises: the allocator monitoring outputting of the completion indicators; and once the allocator has received completion indicators from all optimisers, the allocator instructing each optimiser to continue processing any requests issued after the write request with which the fence indicator is associated, which have had processing deferred at step d).

Preferably, the step of instructing each optimiser to continue processing any requests issued after the write request with which the fence indicator is associated, which have had processing deferred at step d) comprises sending an indicator to each optimiser. The indicators may take any suitable format. In one embodiment, the indicators comprise one or more bits of data added to the write request and transmitted together with the write request. In that embodiment, the state of the data bits preferably indicates whether the optimisers should continue processing. For example, a first state may indicate that the optimiser should defer the processing of any requests from at least the first master device issued after the write request with which the fence indicator is associated. A second state may indicate that the optimiser should continue processing any requests issued after the write request with which the fence indicator is associated, which have had processing deferred.

In an alternative embodiment, the indicators comprise one or more bits of data, or a data signal transmitted separately from the write request. In that embodiment, the indicators may be sent only when the completion indicators have been outputted. In that case, the presence of the data bits or data signal indicates that the optimisers should continue processing.

In one embodiment, the value of the fence indicator is equal to the number of optimisers and an initial value of the proceed indicator is zero. The method may further comprise the optimisers deferring processing of any requests issued after the write request with which the fence indicator is associated if the value of the fence indicator is not equal to the proceed indicator but resuming processing of any requests issued after the write request with which the fence indicator is associated if the value of the fence indicator is equal to the proceed indicator. The method may further comprise the allocator incrementing the value of the proceed indicator by one to form an updated value, each time a completion indicator is received from an optimiser. Then, when all completion indicators have been received, the updated value of the proceed indicator is equal to the fence indicator.

In an alternative embodiment, an initial value of the proceed indicator is equal to the number of optimisers and the value of the fence indicator is zero. The method may further comprise the optimisers deferring processing of any requests issued after the write request with which the fence indicator is associated if the value of the fence indicator is not equal to the proceed indicator but resuming processing of any requests issued after the write request with which the fence indicator is associated if the value of the fence indicator is equal to the proceed indicator. The method may further comprise the allocator decrementing the value of the proceed indicator by one to form an updated value, each time a completion indicator is received from an optimiser. Then, when all completion indicators have been received, the updated value of the proceed indicator is equal to zero and equal to the fence indicator.

Preferably the bus architecture comprises at least two slave devices, at least one slave device being a router for one master device to access another master device.

According to the second aspect of the invention, there is also provided a bus architecture comprising: a bus for connecting at least two master devices with at least one slave device; and an optimiser for the or each slave device, each optimiser for buffering incoming requests for the respective slave device; wherein the bus is arranged to receive write requests from the master devices for the slave devices; wherein the architecture is arranged to generate a fence indicator associated with at least some write requests, the fence indicator indicating that the write request to the slave device should be completed before subsequently issued requests from at least the first of the master devices are commenced; wherein each optimiser is arranged, on receipt of a fence indicator, to process all its requests issued before the write request with which the fence indicator is associated and to defer the processing of any requests issued after the write request with which the fence indicator is associated, and, once all its requests issued before the write request with which the fence indicator is associated have been processed, to output a completion indicator; wherein the optimiser of the slave device to which the write request was directed is further arranged, on receipt of a fence indicator, to process the write request itself and once all its requests issued before the write request with which the fence indicator is associated, and the write request itself, have been processed, to output a completion indicator.

In a preferred arrangement, the architecture includes an allocator for allocating incoming requests from a master device to a target slave device. In that case, preferably, the allocator is arranged to generate the fence indicator.

Preferably, the architecture is arranged to monitor outputting of the completion indicators and, on receipt of completion indicators from all optimisers, to instruct each optimiser to continue processing any requests issued after the write request with which the fence indicator is associated, which have had processing deferred. This may be performed by the allocator.

Features described in relation to the method of this aspect of the invention may also be applicable to the architecture of this aspect of the invention and features described in relation to the architecture of this aspect of the invention may also be applicable to the method of this aspect of the invention.

According to a third aspect of the invention, there is provided a method for sending data in a bus architecture from at least one slave device to a plurality of master pathways via a bus, the architecture comprising a buffer for buffering data from the at least one slave device, wherein a clock rate of the bus is higher than a clock rate of each master pathway, the method comprising the steps of: a) maintaining, in the buffer, a data queue for each master pathway for data received from the slave device; b) selecting the data packet at the front of each master pathway queue in the buffer in a round robin manner; and c) sending, via the bus, the selected data packet to the master pathway to which it is directed.

Because data is selected from the master pathway queues in a round robin manner, rather than being sent together as groups of data to a single master pathway, the access to each master pathway can be as close to maximum capability as possible. Thus, the chance that data transfer is limited by the slower clock rate at each master pathway is reduced. A round robin manner means that each queue is selected in turn for transmission of its first data packet. If there is no data in a particular data queue, the next queue is selected.

Each master pathway may lead to a single master device or to a plurality of master devices. If each pathway leads to a single master device, the method comprises a method for sending data in a bus architecture from at least one slave device to a plurality of master devices via a bus, the architecture comprising a buffer for buffering data from the at least one slave device, wherein a clock rate of the bus is higher than a clock rate of each master device, the method comprising the steps of: a) maintaining, in the buffer, a data queue for each master device for data received from the slave device; b) selecting the data packet at the front of each master device queue in the buffer in a round robin manner, and c) sending, via the bus, the selected data packet to the master device to which it is directed. Preferably, each master device has a single path for sending data from the bus to the master device.

Preferably, the bus comprises an arbiter for arbitrating priority for the bus use rights. Preferably, the bus architecture comprises at least one optimiser for the at least one slave device, the optimiser for buffering data from the respective slave device. Preferably, the buffer is in the optimiser. Preferably, the buffer forms part of the optimiser RAM.

Preferably, the data sent from the at least one slave device to a master pathway is sent from the slave device in response to a read request from a master device on that master pathway. That is to say, the method is preferably for sending data in a bus architecture from at least one slave device to a plurality of master devices in response to read requests issued by the plurality of master devices.

In that case, preferably the architecture comprises a buffer for buffering requests from a master device for the at least one slave device. The buffer may be separate from, or integral with, the buffer for buffering data from the at least one slave device. Preferably, the bus architecture comprises an optimiser and the or each buffer is in the optimiser.

According to a particularly preferred embodiment, the method further comprises the steps of: buffering read requests from a plurality of master devices on the plurality of master pathways to the at least one slave device; and selecting read requests to send to the at least one slave device according to the length of the data queues for the master pathways maintained in the buffer.

Preferably, this selection is achieved by at least one optimiser for the at least one slave device. Preferably, the step of selecting read requests to send to the at least one slave device according to the length of the data queues for the master pathways maintained in the buffer comprises prioritising read requests from those master devices whose pathways have the shortest data queues maintained in the buffer. The aim is to keep the data queues maintained in the buffer approximately equal for all the master pathways. This allows access to each master pathway to be as close to maximum capability as possible.

In a preferred arrangement, the clock rate of the bus is greater than the clock rate of the master pathways by a multiple equal to or less than the number of master pathways. This allows the maximum rate to be achievable by each master pathway.

If the clock rate of the bus is greater than the clock rate of the master pathways by a multiple equal to the number of master pathways, maximum rate will be achievable if all the data queues are full. That is to say, if there is always a packet in each master pathway queue and the clock rate of the bus is greater than the clock rate of the master pathways by a multiple equal to the number of master pathways, use of the slower clock rate will be maximised. Thus, this may be the preferred arrangement if there is likely to always be data for all master pathways in the respective queues.

However, if the clock rate of the bus is greater than the clock rate of the master pathways by a multiple less than the number of master pathways, if all the data queues are full, maximum capability will not be utilised. If one or more of the data queues do not have data packets to transmit, however, access will become closer to maximum capability. Thus, this may be the preferred arrangement if there is likely to be substantial differences in queue length, for example if some master devices are likely to be sending substantially more requests to the slave device than other master devices and hence some master pathways will be receiving substantially more data from the slave device than others.

According to the third aspect of the invention, there is also provided a bus architecture comprising: a bus for connecting a plurality of master pathways with at least one slave device, a clock rate of the bus being higher than a clock rate at each master pathway; and a buffer for buffering data from the at least one slave device; wherein the bus is arranged to maintain, in the buffer, a data queue for each master pathway for data received from the slave device; to select the data packet at the front of each master pathway queue in the buffer in a round robin manner; and to send the selected data packet to the master pathway to which it is directed.

Preferably, the data received from the slave device is sent from the slave device in response to a read request from a master device on a master pathway.

Preferably, the bus architecture further comprises an optimiser for the at least one slave device, the optimiser being arranged to select read requests to send to the at least one slave device according to the length of the data queues for the master pathways maintained in the buffer.

Features described in relation to the method of this aspect of the invention may also be applicable to the architecture of this aspect of the invention and features described in relation to the architecture of this aspect of the invention may also be applicable to the method of this aspect of the invention Features described in relation to one aspect of the invention may also be applicable to other aspects of the invention.

BRIEF DESCRIPTION OF THE DRAWINGS

FIG. 1, which shows an example of well known bus architecture, has already been described. Exemplary embodiments of the invention will now be described with reference to FIGS. 2a, 2b, 3a, 3b, 4a, 4b and 4c, of which:

FIG. 4b is a diagram of an exemplary bus architecture, also showing data sent between components, which is an improvement over the architecture of FIG. 4a.

DETAILED DESCRIPTION OF A PREFERRED EMBODIMENT

Figure 2A:
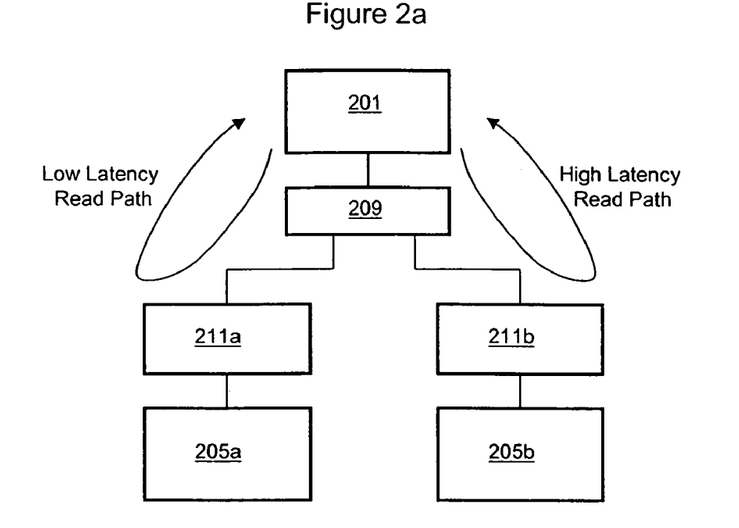
FIG. 2a is a diagram of an exemplary bus architecture in which a problem of read latency may occur.

FIG. 2a shows an exemplary bus architecture in which a problem of read latency may occur. The architecture comprises master device 201 connected to two slave devices 205a, 205b via allocator 209 and optimisers 211a, 211b for slave devices 205a, 205b respectively. The read path from master device 201 to optimiser 211a and slave device 205a is a low latency read path, whereas the read path from master device 201 to optimiser 211b and slave device 205b is a high latency read path. That is to say, a read request targeting slave device 205b will suffer from more delay than a read request targeting slave device 205a.

Referring to FIG. 2a, if master device 201 issues a read request B to slave device 205b, and issues a subsequent read request A to slave device 205a, both requests will be pending in the system at the same time. The bus architecture must allow all requests issued by a master device to pass to the optimisers without blocking, so the architecture has no ability to control read order by blocking the read request issued by the master device from passing to the optimiser. For the arrangement shown in FIG. 2a, in which the read path from master device 201 to optimiser 211a has a lower latency than to optimiser 211b, the read data may return in the reverse order from the order of the read requests. This may result in the master device 201 being unable to operate correctly.

Such a problem may occur in any number of architectures, for example, in which different read paths suffer from different latencies. This will often be the case, for example, when one slave device is on-chip, i.e. an internal slave, whereas another slave device is off-chip, i.e. an external slave. FIG. 2a is a relatively simple example.

Figure 2B:
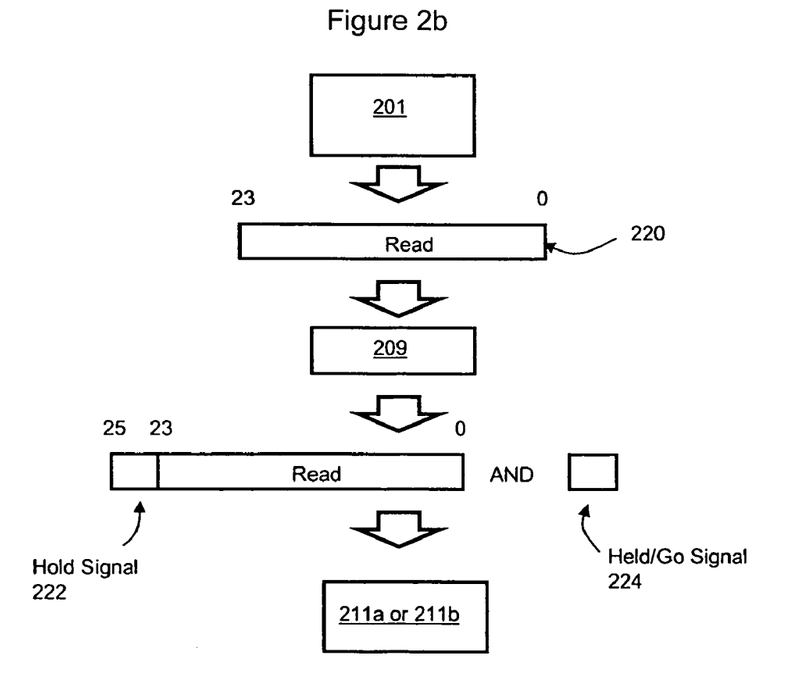
FIG. 2b is a schematic diagram showing data sent between the components in the architecture of FIG. 2a, according to an embodiment of the first aspect of the invention.

According to an embodiment of the invention, this problem is solved by the allocator adding an indicator to a read request as it passes from a master device to an optimiser. This is shown schematically in FIG. 2b. Firstly, a read request 220 is sent from the master device 201 to the allocator 209. In FIG. 2b, the read request 220 is shown as a 24 bit request, although any suitable format for the read request may be adopted. The read request should include address information and any other required information. Then, in this embodiment, the allocator 209 adds an indicator to the read request 220. In this embodiment, the indicator is referred to as a "hold signal" 222. In FIG. 2b, the hold signal 222 is shown as a 2 bit addition to the read request 220, although any suitable format for the indicator and for the read request and indicator combination may be adopted. Indeed, the hold signal may not be added to the read request and may be transmitted separately. Moreover, although FIG. 2b shows the allocator 209 generating the hold signal, in fact the hold signal may be generated by any component in the architecture, including by the master device which originally sent the read request. The hold signal 222 indicates the read request's validation or priority level. Because the hold signal effectively indicates a property of the read request, the preferred arrangement is that the hold signal is added to the read request and transmitted with the read request, as shown in FIG. 2b.

In addition, in this embodiment, the allocator 209, as well as transmitting the read request 220 with the added hold signal 222, sends another indicator to the optimiser 211. In this embodiment, the second indicator is referred to as a "held/go signal" 224. In FIG. 2b, the held/go signal 224 is shown as a signal which is sent separately from the read request 220 and hold signal 222. Indeed, this is the preferred arrangement. In this case, the held/go signal 224 may be sent before, afterwards or at the same time as the read request 220 and hold signal 222. Alternatively, the held/go signal 224 may be implemented in a similar way to the hold signal, for example as an addition to the read request 220. However, as set out below, updated values of the held/go signal may be required to be sent from the allocator at a later time. So, the held/go signal must have a form which allows it to exist independently from the read request, thereby allowing an updated value of the held/go signal to be sent separately from the read request. The held/go signal indicates the value of the hold signal that a read request must have in order for it to be usable by the optimiser 211a, 211b of the target slave apparatus. The allocator 209 sends the read request 220, together with the hold signal 222, and the held/go signal 224, to the target slave apparatus optimiser 211a or 211b.

When the read request reaches the front of the queue in the optimiser, if the value of the hold signal is equal to the value indicated by the held/go signal, the optimiser will action the read request. However, if the value of the hold signal is not equal to the value indicated by the held/go signal, the optimiser will defer processing of the read request. The deferred read request may be sent to the back of the optimiser queue or may be sent to second place in the queue, optimiser or may be handled in any suitable way according to the optimiser settings In this embodiment, the allocator 209 monitors returning traffic from read requests and, when appropriate, updates the value of the held/go signal and sends the updated held/go signal to the relevant optimiser. Then, when the read request reaches the front of the queue in the optimiser once again, if the value of the hold signal is equal to the value indicated by the updated held/go signal, the optimiser will action the read request. If not, processing of the read request will again be deferred until a later updated value of the held/go signal matches the value of the hold signal. Note that the hold signal of a read request has one and only one value which indicates the value of the held/go signal that must be matched in order for it to be usable by the optimiser. The held/go signal, on the other hand, takes an initial value and then may have one or more updated values updated by the allocator. Note that the components maintain the value of the hold signal and held/go signal as they transmit them, so that the hold signal and held/go signal can be passed through a number of chained together components, for example, allocators and arbiters, and still be maintained at the appropriate value.

In the example, only a single allocator is shown. However, this is rather simplistic and it is likely that a plurality of allocators will be included in the bus architecture. In that case, each allocator may be independently generating hold signals and held/go signals for various read requests. In that case, the value of a hold signal, an initial value of a held/go signal and any updated values of a held/go signal may be dependent on a value of a hold signal or held/go signal issued by another allocator.

In one embodiment, the held/go signal is implemented as a communication from the allocator to the optimiser in the form of a signal for each state for each optimiser. Or, the held/go signal could be sent over a separate bus so that values of the held/go signal can be sent periodically and independently from the read request themselves.

Referring to FIG. 2a and to the example set out above, the problem of read latency may be solved by the invention as follows. Master device 201 issues read request B to slave device 205b. Then, master device 201 issues read request A to slave device 205a. In the allocator 209, a hold signal B value=x is generated. In addition, held/go signal B value=x is generated. Read request B, hold signal B value=x and held/go signal B value=x are sent from allocator 209 to optimiser 211b. Similarly, in the allocator 209, a hold signal A value=y is generated and a held/go signal A value≠y is generated. Read request A, hold signal A value=y and held/go signal A value≠y are sent from allocator 209 to optimiser 211a.

In optimiser 211b, when read request B reaches the front of the queue, because hold signal B value=held/go signal B value=x, read request B is actioned. In optimiser 211a, when read request A reaches the front of the queue, because hold signal A value=y, whereas held/go signal A value≠y, read request A is paused. Read request A may be sent to second place in the queue or sent to the back of the queue or dealt with in another way according to optimiser 211b settings.

Data from read request B is then returned to master 201 via allocator 209. The allocator 209 monitors receipt of the data from the read request B and, when the data is received, sends a held/go signal A updated value=y to optimiser 211a. In optimiser 211a, when read request A again reaches the front of the queue, because hold signal A value=held/go signal A updated value=y, read request A is now actioned. Thus, the read data is guaranteed to return in the same order as issued by the master device 201.

In the example given above, read request A is only dependent on read request B. However, it is possible that read request A could be dependent on a number of read requests, in which case the allocator would only set the held/go signal value to equal the hold signal value when all the earlier read requests have been completed. The allocator may send the original held/go signal more than once, for example repeatedly. In addition, the allocator may send updated held/go signals more than once. The allocator may set the held/go signal value to interim values between the initial value and the value that matches the hold signal as the read requests are each completed. Such interim values may also be sent by the allocator more than once.

The format of the hold signal and held/go signal may take any appropriate form. However, in one embodiment, the held/go signal is implemented as a counter. If a read request is dependent on one or more earlier read requests having been completed, before it can be actioned correctly, the hold signal may be set to a value equal to the number of earlier requests. The held/go signal is initially set to zero. As each earlier request is completed, the allocator increments the held/go signal counter by 1. Then, when all the earlier requests are completed, the vale of the held/go signal value must equal that of the hold signal of the read request. This not only enables the returning data to return in the correct order, but also provides a simple way for the allocator to keep track of how many of the earlier read requests have been processed. Alternatively, the hold signal may be set to zero, with the held/go signal initially set to the number of earlier requests. Then, as each earlier request is completed, the allocator decrements, rather than increments, the held/go signal counter by 1. Each updated value of the held/go signal can be transmitted. Or, the allocator can simply keep internal track of the counter, and transmit the updated held/go signal only when it is equal to the hold signal value.

Figure 3A:
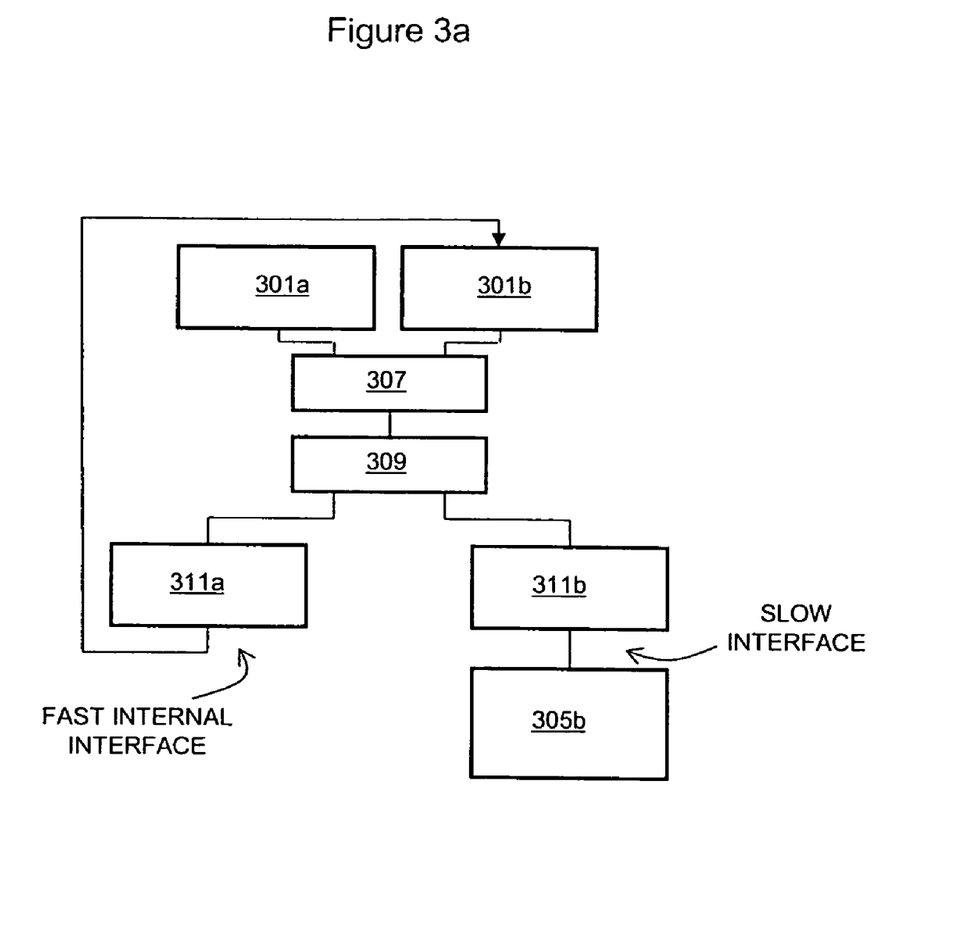
FIG. 3a is a diagram of an exemplary bus architecture in which a problem of data coherency may occur.

FIG. 3a shows an exemplary bus architecture in which a problem of data coherency may occur. The architecture shows two master devices 301a, 301b connected to optimiser 311a and to slave device 305b via optimiser 311b, via arbiter 307 and allocator 309. The interface between optimiser 311b and slave device 305b is a slow interface, which may result in extensive buffering within optimiser 311b. However, the interface between optimiser 311a towards master device 301b is a fast internal interface.

Referring to FIG. 3a, suppose master device 301a issues data, that is to say, a write request, towards slave device 305b. Due to the slow interface between optimiser 311b and slave device 305b, the data may be held in optimiser 311b's buffer, awaiting transmission to slave device 305b. Once the master device 301a has issued the data towards slave device 305b, it issues a communication to master device 301b via a data write request. The data write request routes through optimiser 311a. Once the communication is received by master device 301b, this allows master device 301b to begin to issue data requests to slave device 305b. Because the interface between optimiser 311a and master device 301b is a fast pathway, data requests from master device 301b may reach optimiser 311b while the original data issued by master device 301a is still waiting within optimiser 311b. The optimiser 311b chooses ordering of its buffered requests simply according to priority and efficiency. Therefore, it is a legitimate possibility that optimiser 311b selects the requests from master device 301b before those of master device 301a. This may mean that the data returning to master device 301b from its read requests has incorrect values, because the requests from master device 301a have not reached slave device 305b.

Such a problem may occur in any number of architectures in which more than one master device is issuing requests to a single slave device, in particular where different interfaces suffer from different latencies. This will often be the case, for example, when one interface is an external, off-chip, slower interface and another interface is an internal, on-chip, faster interface. FIG. 3a is a relatively simple example.

According to an embodiment of the invention, this problem is solved by a special bus request associated with a write request being issued. The special bus request may be issued by a master device or by the allocator or by any other bus component. This is shown schematically in FIG. 3b. The bus request ensures that all requests issued by at least the master device which issued the write request prior to the bus request are guaranteed to exit their optimiser before any request issued after the bus request. The format of the request is shown schematically in FIG. 3b. In this embodiment, the bus request is referred to as a "system fence".

Figure 3B:
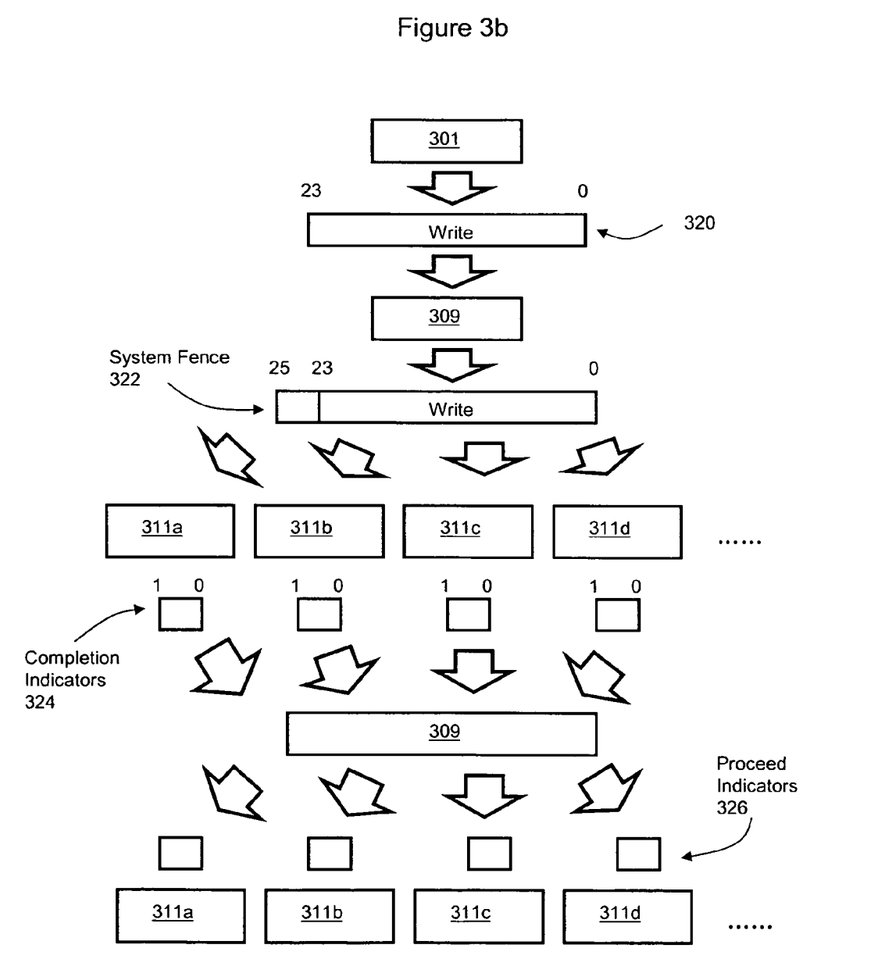
FIG. 3b is a schematic diagram showing the data sent between components in architecture of FIG. 3a, according to an embodiment of the second aspect of the invention.

Firstly, a write request 320 is sent from a master device 301 to the allocator 309 (in the case of FIG. 3a via arbiter 307). In FIG. 3b, the write request is shown as a 24 bit data instruction, although any suitable format for the write request may be adopted. Then, in this embodiment, the allocator 309 adds an indicator to the write request 320. In this embodiment, the indicator is referred to as a "system fence" indicator 322. In FIG. 3b, the allocator is shown adding the system fence indicator to the write request. However, the generation and addition of the fence indicator could be performed by any bus component or may even be performed at the master device itself. In addition, in FIG. 3b, the system fence indicator is shown as a 2 bit addition to the write request 320, although any suitable format for the indicator and for the write request and indicator combination may be adopted. Indeed, the system fence indicator may not be added to the write request and may be transmitted separately. In this embodiment, the system fence indicator 322 indicates that the write request to which it is added, and any requests issued by master device 301 to any slave device prior to that write request, should be completed before processing begins for any requests that were issued after the write request. It is possible, however, that the system fence indicator indicates that the write request to which it is added, and any requests issued by any master device to any slave device prior to that write request, should be completed before processing begins for any requests that were issued after the write request.

The allocator transmits the write request 320 and the system fence indicator 322 to all its output ports. That is to say, the write request and the system fence indicator are sent to all optimisers 311. It is possible that only the system fence indicator 322 (i.e. without the write request itself) is sent to all the optimisers, as long as the optimisers have sufficient information from the system fence indicator alone, to perform their subsequent functions. Clearly, the write request itself must always be sent to the optimiser of the slave device to which it is directed.

Each optimiser buffers and re-sorts incoming requests for its slave device. When an optimiser 311 receives the write request 320 and system fence indicator 322, this indicates that any requests buffered in the optimiser which were issued before the write request should be processed, but that any requests which were issued after the write request should be deferred until there is confirmation to proceed. That is to say, those requests issued before the write request can be actioned and can exit the optimiser. Those requests issued after the write request should be deferred, for example, held within the optimiser buffer. For the optimiser of the slave device to which the write request itself was addressed, the write request itself should be actioned.

Once an optimiser has actioned all its requests issued before the write request (and has actioned the write request itself if that is appropriate), the optimiser issues a completion indicator to the allocator 309. This is shown schematically in FIG. 3b at 324. In FIG. 3b, the completion indicator from each optimiser 311 is shown as a 2 bit piece of data, although any suitable format for each completion indicator may be adopted and the format does not need to be the same for each and every optimiser. Effectively, the system fence indicator tells the optimisers that, unlike a normal write request without a system fence indicator where no data needs to be returned, data should be returned once that write request (and all preceding requests) have been completed. That returning data comprises the completion indicators.

In this embodiment, the allocator 309 monitors receipt of the completion indicators from the optimisers 311. However, any bus component could monitor receipt. Once completion indicators from all optimisers 311 have been received, the allocator 309 (or other component) knows that all requests issued prior to the write request to which the system fence indicator was attached have been completed. At this point, it is safe for requests which were issued after the write request to be processed, as they are then guaranteed to access the correct data. Then allocator 309 (or other component) transmits a further indicator to each optimiser. In FIG. 3b, this is shown as a proceed indicator 326. The proceed indicator indicates that the optimiser can resume normal processing including processing those requests issued after the write request.

In FIG. 3b, the proceed indicators are shown as a signal sent separately from the write request, but the proceed indicators may have any suitable format. In addition, proceed indicators, having a first state, may be sent together with the write request and system fence indicator. The first state would indicate that the requests issued after the write request should not yet be actioned. Then, after receipt of all the completion indicators, proceed indicators, having a second state, may be sent to the optimisers. This would advance the state of the proceed indicator to instruct the optimisers that normal processing may be resumed. That is, either the presence of the proceed indicators can be used to instruct the optimisers to proceed, or the state of the proceed indicators can be used to indicate whether or not the optimisers should proceed with normal processing.

In one embodiment, the address field of the write request may be used to provide the system fence indicator and/or proceed indicator. This is possible because the write request and system fence are sent to all optimisers so the address field in fact becomes redundant.

In the example, only a single allocator is shown. However, this is rather simplistic and it is likely that a plurality of allocators will be included in the bus architecture. In that case, when the proceed indicator is issued may be dependent on receipt of data from other allocators, as well as from the optimisers.

Referring to the example set out above, the problem of data coherency may be solved by the invention as follows. After master device 301a has issued the write request towards slave device 305b, the "system fence" indication is issued. Then the master device 301a issues the communication to master device 301b via the data write request. In this example, the "system fence" goes to optimiser 311a and optimiser 311b. The "system fence" indicates that the data requests from master device 301b to slave device 305b, resulting from the data write request from master device 301a to master device 301b, must exit optimiser 311b after the write request issued by master device 301a to slave device 305b. So, optimiser 311b actions the write request to slave device 305b. Optimiser 311b also actions any other requests in the optimiser 311b which were issued prior to that write request. Optimiser 311a also actions in the optimiser 311a which were issued prior to that write request. (Note that, the "actioned" requests may actually still lie within the optimiser. The important point, however, is that the requests are at a point in the optimiser queue where no other requests can get ahead. So the actioned requests are effectively at the slave device.) Then, optimiser 311a sends back a completion indicator to allocator 309. And, optimiser 311b sends back a completion indicator to allocator 309. Once the allocator 309 has received completion indicators from both optimiser 311a and optimiser 311b (since there are only two optimisers in this example), the allocator sends the proceed indicator to both optimisers 311a, 311b. This indicates that the optimisers can continue processing as normal. In this case, optimiser 311a now actions the data write request from master device 301a to master device 301b, which results in processing of the data requests from master device 301b to slave device 305b. It is ensured that those data requests pick up the correct data.

This will ensure that master device 301b does not attempt to access data until it is truly available. This will ensure the data returning to master device 301b from its read request is the correct data. Thus, master device 301b benefits since it is guaranteed to received the correct information. Moreover, master device 301*a* benefits since it is can simply make use of the general bus architecture, without having to take particular precaution to ensure data has reached a target slave device before access to that slave device is available to another master device.

Figure 4A:
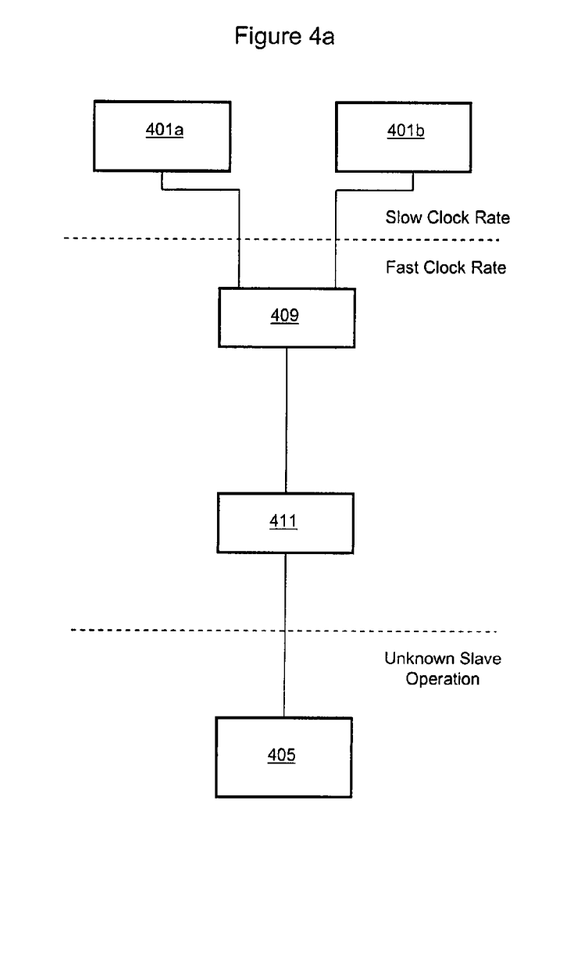
FIG. 4a is a diagram of an exemplary bus architecture in which a problem of bottle-necking may occur because of different clock rates.

FIG. 4*a* shows an exemplary bus architecture in which a problem of bottle-necking may occur because of different clock rates. The architecture comprises two master devices 401*a*, 401*b* connected to a slave device 405 via arbiter 409 and optimiser 411. In FIG. 4*a*, master devices 401*a*, 401*b* are running at a slow clock rate, whereas arbiter 409 and optimiser 411 are running at a fast clock rate. The slave device 405 is running at another, unknown, clock rate. In a number of architectures, including that shown in FIG. 4*a*, the clock rates affect the overall performance achievable by parts of the bus architecture or the entire bus architecture. A bottle-neck may occur at the interface between different clock rates. For example, in the arrangement of FIG. 4*a*, a data bottle-neck may occur at the interface between master devices 401*a*, 401*b* and arbiter 409.

Perhaps more significantly, if the slave device 405 is running at a faster clock rate than the main bus architecture (i.e. arbiter 409), a single path between the bus architecture and the high clock rate slave device artificially limits the access rate to that of the slower component. Such a problem may occur in any number of architectures and FIG. 4*a* shows a relatively simple arrangement. Different clock rates, and hence bottle-necks, may occur at an external interface although they may also occur at an internal interface, depending on the particulars of the architecture.

Figure 4B:
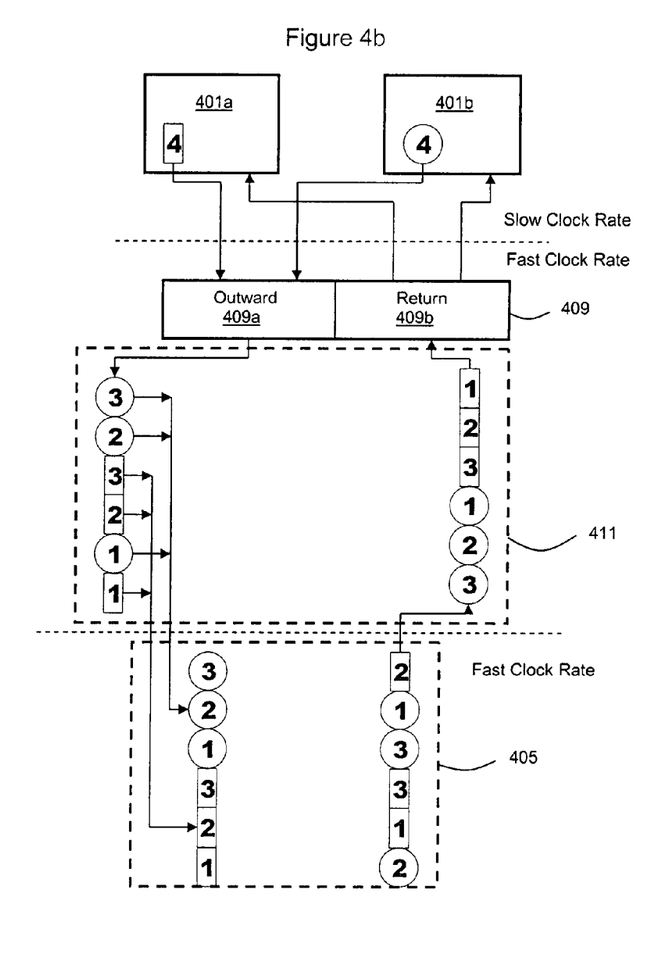

A typical request scenario for the exemplary architecture of FIG. 4*a* is illustrated schematically in FIG. 4*b*. FIG. 4*b* also shows an improvement to the simple FIG. 4*a* arrangement. FIG. 4*b* shows the two master devices 401*a*, 401*b* sending requests for data to be returned from a target slave device 405. In FIG. 4*b*, the requests from master device 401*a* and return data to master device 401*a* are schematically shown as rectangular blocks and the requests from master device 401*b* and return data to master device 401*b* are schematically shown as circular blocks. In this example, the slave device 405 has a clock rate higher than that of the master devices 401*a*, 401*b*. The arbiter 409 also has a clock rate higher than that of the master devices 401 although not necessarily equal to that of the slave device 405. In FIG. 4*b*, an improvement to the arrangement shown in FIG. 4*a* has been made by increasing the number of slower paths into the faster rate components. That is to say, by allowing the faster components to accept more traffic than a single port can provide, better performance can be achieved.

In the FIG. 4*b* example, the faster clock rate at the arbiter 409 is twice that of the slower clock rate at master devices 401*a*, 401*b*. This allows the arbiter 409 to select one request from both master devices 401*a*, 401*b* (if requests are, indeed, available) on every clock tick in the slower domain. Each master device would then be able to use a possible 100% of its slow rate connection, whether or not the other master device was also sending requests. This is shown in FIG. 4*b* as two inputs to the arbiter 409—one from master device 401*a* and one from master device 401*b*—and two outputs from the arbiter 409—one to master device 401*a* and one to master device 401*b*. So, in FIG. 4*b*, arbiter 409 is shown with an "Outward" portion 409*a* for transmitting requests from the master devices 401*a*, 401*b* towards the slave device 405 and a "Return" portion 409*b* for transmitting returned data from the slave device 405 to the relevant master device 401*a*, 401*b*. The Outward portion 409*a* has an input from each master device 401*a*, 401*b*. As mentioned above, this is possible in this example because the clock rate at the arbiter 409 is twice that at the master devices 401*a*, 401*b*. The Outward portion 409*a* also has an output to optimiser 411 and slave device 405. The Return portion 409 has an input from optimiser 411 and slave device 405. The Return portion also has an output to each master device 401*a*, 401*b*. Again, this is possible in this example because the clock rate at the arbiter 409 is twice that at the master devices 401*a*, 401*b*.

In the FIG. 4*b* example, each master device 401*a*, 401*b* has issued three requests. A fourth request is waiting to be sent. The requests are buffered in optimiser 411 and re-sorted and sent to the slave device 405 as groups of requests. All three requests from master device 401*a* are sent first, followed by all three requests from master device 401*b*. Data returning from the slave device 405 has an unpredictable return order. The returning data is re-sorted in the optimiser 411 and sent back to the arbiter 409 as groups of return data. Data for all three requests from master device 401*a* are sent first. Data for all three requests from master device 401*b* are sent second. After the returning data exits the arbiter 409, the data is resynchronised to the slower clock domain at the master devices 401*a*, 401*b*.

A first problem with the arrangements shown in both FIGS. 4*a* and 4*b* is that standard optimiser design and standard access patterns result in blocks of return data trying to output on a single slow rate path from the arbiter to a master device. Another problem is how to achieve the maximum return data efficiency. The bottle-neck of the system is now the return path through the arbiter 409. Due to the grouping of requests to achieve maximum efficiency from the slave device, there are groups of return data queued for return to a single master device. With the master devices 401*a*, 401*b* operating at a slower clock rate than the arbiter 409, the arbiter 409 shall be required to slow its transfer to a rate which the master device can tolerate.

According to an embodiment of the invention, this problem is solved by making use of the single RAM store in the optimiser buffer. As shown in FIG. 4*b*, the optimiser is already used to re-order data received from the slave device. The optimiser allows each master device's requests to be considered as independent queues from a single RAM buffer. According to an embodiment of the invention shown in FIG. 4*c*, the optimiser maintains a separate queue for each master device. The optimiser then selects a master device queue for transmission, by a round robin method. That is to say, the optimiser selects the master device queues in turn and sends the data packet at the front of the selected data queue. This allows data to be sent on every cycle of the faster clock (when data is available), by sending to different slower rate paths alternately.

Figure 4C:
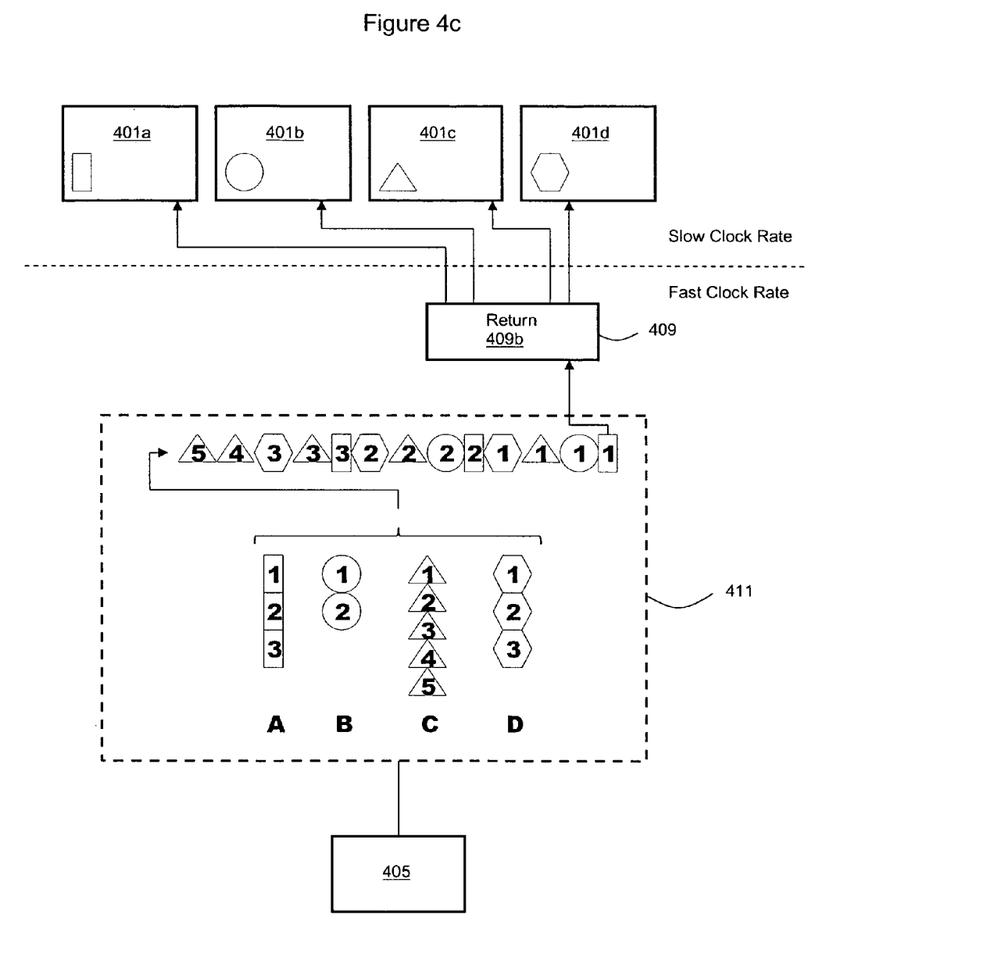
FIG. 4c is a schematic diagram showing the data sent between components in architecture of FIG. 4a or 4b, according to an embodiment of the third aspect of the invention.

This is shown schematically in FIG. 4*c*, which shows only the return data path for simplicity. In FIG. 4*c*, there are four master devices 401*a*, 401*b*, 401*c*, 401*d* connected to a slave device 405 via arbiter 409 and optimiser 411. In FIG. 4*c*, the return data to master device 401*a* is schematically shown as rectangular blocks, the return data to master device 401*b* is schematically shown as circular blocks, the return data to master device 401*c* is schematically shown as triangular blocks and return data to master device 401*d* is schematically shown as hexagonal blocks. In FIG. 4*c*, master devices 401*a*, 401*b*, 401*c*, 401*d* are running at a slow clock rate, whereas arbiter 409 and optimiser 411 are running at a fast clock rate. As in FIG. 4*b*, data returning from the slave device 405 has an unpredictable return order.

The optimiser receives the returning data and maintains a separate queue for each master device. The queue for master device 401*a* is shown as A. The queue for master device 401*b* is shown as B. The queue for master device 401c is shown as C. The queue for master device 401d is shown as D. The optimiser selects each queue in turn for transmission of the first packet in that queue to the arbiter and onward to the appropriate master device. That is to say, optimiser selects the queues in a round robin manner. If a master device has no data in its queue, the optimiser moves to the next queue. In this embodiment, the optimiser is shown to select data packet 1 from queue A, data packet 1 from queue B, data packet 1 from queue C, data packet 1 from D, data packet 2 from queue A, data packet 2 from queue B, data packet 2 from queue C, data packet 2 from queue D and data packet 3 from queue A. At this point, there is no more data in queue B, so data packet 3 from queue C is selected, followed by data packet 3 from queue D. At this point, there is no more data in queue A or queue B so data packet 4 from queue C is selected. At this point there is no more data in queue D or queue A or queue B so data packet 5 from queue C is selected. FIG. 4c is a somewhat artificial example as it is likely that, as the data is being transferred to the arbiter, the master device queues are receiving more incoming data from slave device 405.

In addition, note that, in FIG. 4c, each master device 401a, 401b, 401c, 401d is shown as corresponding to a single master return path. However, each return path could include more than one master device. That is to say, each port of 409b could be connected to more than one master device. In that case, the arrangement works in exactly the same way, but a queue is maintained for each return path, with some or all the return paths corresponding to more than one master device.

Referring to FIG. 4c, consider the case when the clock rate at the bus is four times that at the master devices. As can be seen in FIG. 4c, at the start of the transmission, the master device use is maximised, with 100% of the master device capability being used. As the transmission progresses, the transmission becomes dependent on the slower clock rates at master devices 401c and 401d, and ultimately dependent on the slower clock rate at master device 401c only.

Referring again to FIG. 4c, consider the case when the clock rate at the bus is twice that at the master devices. As can be seen in FIG. 4c, at the start of the transmission, only 50% of each master device capability is being used, since there are four queues, all of which contain data. However, as the transmission progresses, a higher percentage of each master device's capability is used, until the transmission speed ultimately becomes dependent on the slower clock rate at master device 401c since this is the longest queue.

Thus, the use of the master devices will be dependent on the relationship between the two clock rates, the number of master return pathways and the length of the master queues at a particular time. In general, it may be best that the data queues are kept roughly equal for each of the master devices or master return pathways and this can be achieved to a certain extent by the optimiser, as will be set out further below. In general, when the faster clock is x times the rate of the slower clock, at least x paths are required to allow the maximum rate to be achievable by the return path. For example, when the faster clock is twice the rate of the slow clock, two or more paths are required. A greater number of return paths from the arbiter would allow a higher chance that return data is available to different paths and exploit the effect.

As already mentioned, it is preferable in some embodiments, for the data queues for the master return paths to be kept roughly equal so that the master devices are used to maximum capability. The optimiser may achieve this, at least partially, by biasing its selection of outgoing requests from the master devices to the slave device. For example, if one master return path has a notably shorter queue than others, the optimiser may prioritise outgoing requests from that master device(s), as this will result in return data for that master device(s), so that the queue for that master device(s) will become longer. This would be used to attempt to have data available to return to multiple paths. If only one path has return data, the data queue may build up and cause the data rate to be limited by the slow clock rate. The system's normal request priority requirements would be required to be met at all times, but this feature could allow a structure to be implemented to achieve optimum results for a particular application.

The invention claimed is:

1. A method for processing read requests in a bus architecture comprising at least one master device connected to at least two slave devices via a bus, the architecture comprising an optimiser for each slave device, each optimiser for buffering incoming requests for the respective slave device, the method comprising the steps of:
   a) the master device sending a read request for a first slave device to the bus;
   b) generating a priority indicator associated with the read request;
   c) generating a current-state indicator associated with the read request, the current-state indicator having an initial value;
   d) sending the read request, the priority indicator and the current-state indicator to the optimiser of the first slave device;
   e) the optimiser of the first slave device receiving the read request, the priority indicator and the current-state indicator; and
      i) if the initial value of the current-state indicator equals the value of the priority indicator, processing the read request; or
      ii) if the initial value of the current-state indicator does not equal the value of priority indicator, deferring processing of the read request until a later time.

2. A method according to claim 1, further comprising the steps of:
   sending an updated value of the current-state indicator to the optimiser of the first slave device; and
   if the updated value of the current-state indicator equals the value of the priority indicator, processing the read request.

3. A method according to claim 2, wherein the read request is dependent on one or more earlier read requests having been completed, and further comprising:
   monitoring return of data for the one or more earlier read requests; and
   sending the updated value of the current-state indicator to the optimiser of the first slave device in response to receipt of data for one or more of the earlier read requests.

4. A method according to claim 3, wherein the value of the priority indicator is equal to the number of earlier read requests on which the read request is dependent and the initial value of the current-state indicator is zero, and the method further comprises the step of:
   incrementing the value of the current-state indicator by one to form an updated value, when data is received for one earlier read request.

5. A method according to claim 3, wherein the value of the priority indicator is equal to zero and the initial value of the current-state indicator is equal to the number of earlier read requests on which the read request is dependent, and the method further comprises the step of:

decrementing the value of the current-state indicator by one to form an updated value, when data is received for one earlier read request.

6. A bus architecture comprising:
a bus for connecting at least one master device with at least two slave devices; and
an optimiser for each slave device, each optimiser for buffering incoming requests for the respective slave device;
wherein the bus is arranged to receive read requests from the master device for the slave devices;
wherein the architecture is arranged to generate a priority indicator associated with each read request and to generate a current-state indicator associated with each read request; and
wherein each optimiser is arranged to process a read request when the current value of the current-state indicator equals the value of the priority indicator and to defer processing of the read request until a later time when the current value of the current-state indicator does not equal the value of the priority indicator.

7. A bus architecture according to claim 6 wherein the architecture is further arranged to set an initial value for the current-state indicator and to subsequently set one or more updated values for the current-state indicator.

8. A bus architecture according to claim 7 wherein a read request sent by the master device is dependent on one or more earlier read requests having been completed and the architecture is further arranged to monitor return of data for the one or more earlier read requests and to set an updated value of the current-state indicator in response to receipt of data for one or more of the earlier read requests.

9. A method for processing requests in a bus architecture comprising at least two master devices connected to at least one slave device via a bus, the architecture comprising an optimiser for the or each slave device, each optimiser for buffering incoming requests for the respective slave device, the method comprising the steps of:
a) a first of the at least two master devices sending a write request for a slave device to the bus;
b) generating a fence indicator associated with the write request, the fence indicator indicating that the write request to the slave device should be completed before subsequently issued requests from at least the first of the master devices to any slave device are commenced;
c) sending the fence indicator to the or each optimiser;
d) each optimiser processing all its requests issued before the write request with which the fence indicator is associated, and the optimiser of the slave device to which the write request was directed further processing the write request itself, and each optimiser deferring the processing of any requests from at least the first master device issued after the write request with which the fence indicator is associated;
e) each optimiser outputting, once all its requests issued before the write request with which the fence indicator is associated have been processed, and if the optimiser is the optimiser of the slave device to which the write request was directed, once all its requests issued before the write request with which the fence indicator is associated, and the write request itself, have been processed, a completion indicator.

10. A method according to claim 9 further comprising, once completion indicators from all optimisers have been outputted, instructing each optimiser to continue processing any requests issued after the write request with which the fence indicator is associated, which have had processing deferred at step d).

11. A method according to claim 10, wherein the architecture comprises an allocator for allocating incoming requests from the master devices to a target slave device, and further comprising:
the allocator monitoring outputting of the completion indicators; and
once the allocator has received completion indicators from all optimisers, the allocator instructing each optimiser to continue processing any requests issued after the write request with which the fence indicator is associated, which have had processing deferred at step d).

12. A bus architecture comprising:
a bus for connecting at least two master devices with at least one slave device; and
an optimiser for the or each slave device, each optimiser for buffering incoming requests for the respective slave device;
wherein the bus is arranged to receive write requests from the master devices for the slave devices;
wherein the architecture is arranged to generate a fence indicator associated with at least some write requests, the fence indicator indicating that the write request to the slave device should be completed before subsequently issued requests from at least the first of the master devices are commenced;
wherein each optimiser is arranged, on receipt of a fence indicator, to process all its requests issued before the write request with which the fence indicator is associated and to defer the processing of any requests from at least the first master device issued after the write request with which the fence indicator is associated, and, once all its requests issued before the write request with which the fence indicator is associated have been processed, to output a completion indicator;
wherein the optimiser of the slave device to which the write request was directed is further arranged, on receipt of a fence indicator, to process the write request itself and once all its requests issued before the write request with which the fence indicator is associated, and the write request itself, have been processed, to output a completion indicator.

13. A bus architecture according to claim 12, wherein the architecture is arranged to monitor outputting of the completion indicators and, on receipt of completion indicators from all optimisers, to instruct each optimiser to continue processing any requests issued after the write request with which the fence indicator is associated, which have had processing deferred.

14. A method for sending data in a bus architecture from at least one slave device to a plurality of master pathways via a bus, the architecture comprising a buffer for buffering data from the at least one slave device, wherein a clock rate of the bus is higher than a clock rate of each master pathway, the method comprising the steps of:
a) maintaining, in the buffer, a data queue for each master pathway for data received from the slave device;
b) selecting the data packet at the front of each master pathway queue in the buffer in a round robin manner; and
c) sending, via the bus, the selected data packet to the master pathway to which it is directed.

15. A method according to claim 14 wherein the data sent from the at least one slave device to a master pathway is sent from the slave device in response to a read request from a master device on that master pathway.

16. A method according to claim 15, further comprising the steps of:

buffering read requests from a plurality of master devices on the plurality of master pathways to the at least one slave device; and selecting read requests to send to the at least one slave device according to the length of the data queues for the master pathways maintained in the buffer.

17. A method according to claim 14, wherein the clock rate of the bus is greater than the clock rate of the master pathways by a multiple equal to or less than the number of master pathways.

18. A bus architecture comprising:

a bus for connecting a plurality of master pathways with at least one slave device, a clock rate of the bus being higher than a clock rate at each master pathway; and a buffer for buffering data from the at least one slave device;

wherein the bus is arranged to maintain, in the buffer, a data queue for each master pathway for data received from the slave device; to select the data packet at the front of each master pathway queue in the buffer in a round robin manner; and to send the selected data packet to the master pathway to which it is directed.

19. A bus architecture according to claim 18, wherein the data received from the slave device is sent from the slave device in response to a read request from a master device on a master pathway.

20. A bus architecture according to claim 19, further comprising an optimiser for the at least one slave device, the optimiser being arranged to select read requests to send to the at least one slave device according to the length of the data queues for the master pathways maintained in the buffer.

* * * * *